US008685188B2

(12) United States Patent

Yamaji et al.

(10) Patent No.: US 8,685,188 B2

(45) Date of Patent: Apr. 1, 2014

(54) APPARATUS AND METHOD FOR FRACTIONATING GYPSUM SLURRY AND METHOD OF PRODUCING GYPSUM BOARD

(75) Inventors: Yukio Yamaji, Kakogawa (JP); Shinobu Kaneko, Tamano (JP)

(73) Assignee: Yoshino Gypsum Co., Ltd., Tokyo (JP)

( * ) Notice: Subject to any disclaimer, the term of this patent is extended or adjusted under 35 U.S.C. 154(b) by 1499 days.

(21) Appl. No.: 10/528,228

(22) PCT Filed: Sep. 12, 2003

(86) PCT No.: PCT/JP03/11677

§ 371 (c)(1), (2), (4) Date: Mar. 18, 2005

(87) PCT Pub. No.: WO2004/026550

PCT Pub. Date: Apr. 1, 2004

(65) Prior Publication Data

US 2006/0045975 A1 Mar. 2, 2006

(30) Foreign Application Priority Data

Sep. 20, 2002 (JP) ................................ 2002-274610

(51) Int. Cl.

*B28C 7/16* (2006.01)

*B32B 37/00* (2006.01)

(52) U.S. Cl.

USPC .................. 156/39; 156/43; 156/44; 156/45; 156/346

(58) Field of Classification Search

USPC ................................ 156/39, 43, 44, 45, 346

See application file for complete search history.

(56) References Cited

U.S. PATENT DOCUMENTS

| | | | | |
|---|---|---|---|---|
| 3,459,620 | A | 8/1969 | McCleary et al. | |
| 4,279,673 | A | 7/1981 | White et al. | |
| 4,455,271 | A * | 6/1984 | Johnson | 264/42 |
| 5,683,635 | A * | 11/1997 | Sucech et al. | 156/346 |
| 5,714,032 | A * | 2/1998 | Ainsley et al. | 156/346 |
| 5,879,486 | A | 3/1999 | Philips et al. | |
| 6,190,476 | B1 * | 2/2001 | Seecharan et al. | 156/44 |
| 6,193,408 | B1 * | 2/2001 | Miura et al. | 366/304 |
| 6,878,321 | B2 * | 4/2005 | Hauber et al. | 156/45 |
| 2001/0044016 | A1 * | 11/2001 | Watras | 156/45 |

FOREIGN PATENT DOCUMENTS

| | | | |
|---|---|---|---|
| CA | 2116132 | A1 | 3/1993 |
| JP | 08025342 | A | 1/1996 |
| JP | 08-112808 | * | 5/1996 |

(Continued)

*Primary Examiner* — Steven D Maki

(74) *Attorney, Agent, or Firm* — Westerman, Hattori, Daniels & Adrian, LLP

(57) ABSTRACT

The present invention provides an apparatus and a method for fractionating gypsum slurry which can surely control the density of the gypsum slurry fractionated from the mixer (fractionated slurry), which can restrict change of the flow rate of the fractionated slurry, and which can reduce the consumption of foam or foaming agent. The fractionation apparatus (30) fractionates the gypsum slurry from a mixer (4) for mixing calcined gypsum and water. The mixer has a hollow connector section (50), which allows the gypsum slurry to flow from a mixing area inside of the mixer into a chute section (5), and the chute section (5) discharging the inflow of gypsum slurry through its slurry discharge port onto a gypsum board liner paper. The fractionation apparatus has a slurry fractionation port (33) opening to the chute section or the hollow connector section, and causes a part of the gypsum slurry in the chute or hollow connector section to be delivered to a slurry delivery conduit (11,13,19).

12 Claims, 12 Drawing Sheets

(56) References Cited

FOREIGN PATENT DOCUMENTS

| | | | |
|---|---|---|---|
| JP | 08112808 | A | 5/1996 |
| JP | 2000006137 | A | 1/2000 |
| JP | 2000262882 | A | 9/2000 |
| JP | 2001300933 | A | 10/2001 |
| JP | 2003262034 | A | 9/2003 |
| JP | 2004106439 | A | 4/2004 |
| WO | WO 9723337 | A1 | 7/1997 |

* cited by examiner

FIG.7
(A)
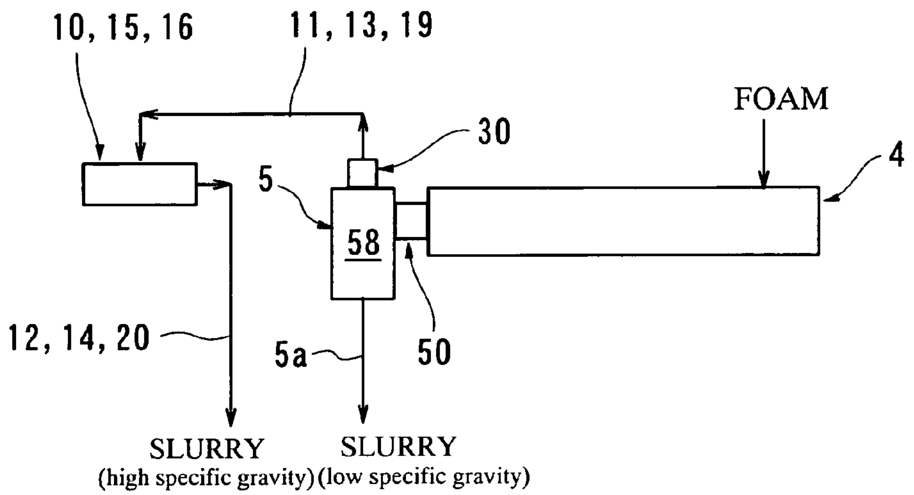
(B)
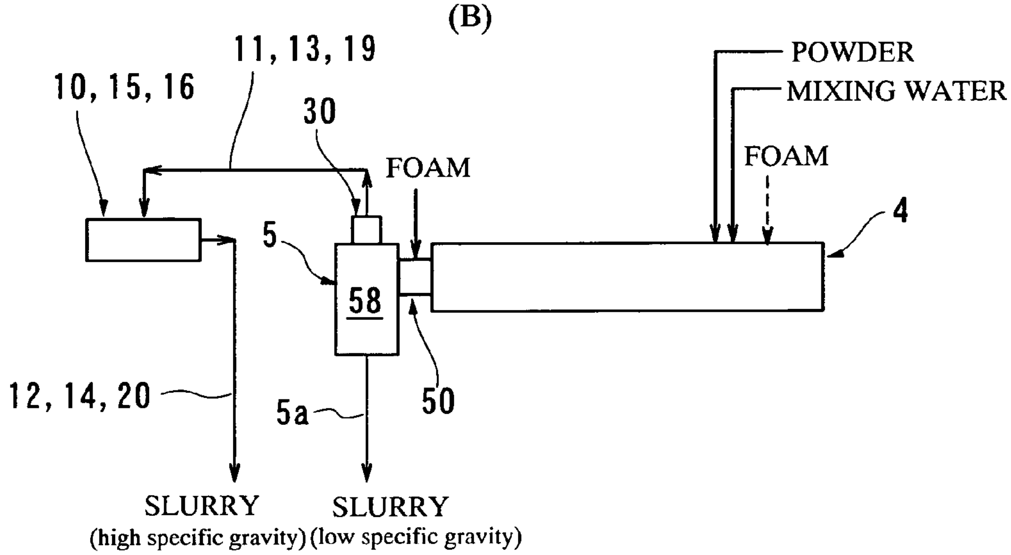

FIG.9
(A)
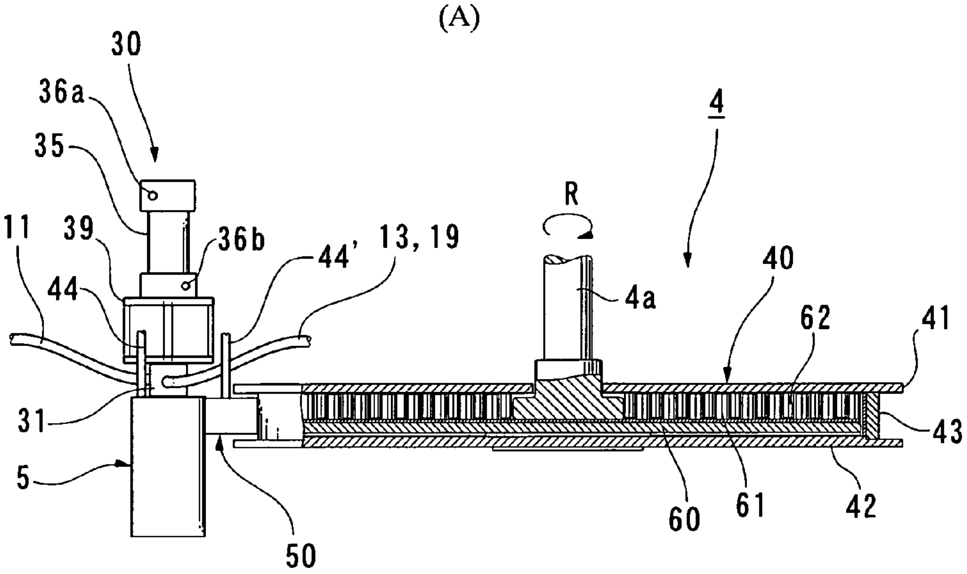
(B)
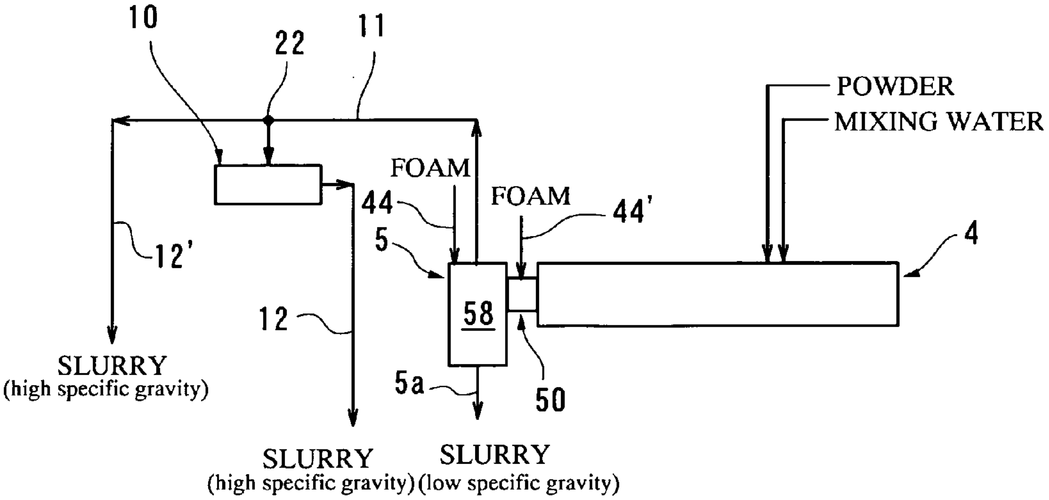

FIG.10

| | Example-1 | | Example-2 | | Comparative Example | |
|---|---|---|---|---|---|---|
| Density of Slurry (g/cm$^3$) | Side Edge Part | Center Part | Side Edge Part | Center Part | Side Edge Part | Center Part |
| Average | 1.23 | 1.08 | 1.24 | 1.06 | 1.24 | 1.05 |
| Standard Deviation | 0.036 | 0.038 | 0.034 | 0.037 | 0.072 | 0.041 |
| Rate of Change in Volume of Fractionated Slurry (B/A) | 0.99 | | 1.02 | | 0.82 | |
| Adhesiveness (%) | | | | | | |
| Right Side Face | 99 | | 99 | | 90 (including test piece having side edge part exfoliated) | |
| Reverse Side Face | 99 | | 100 | | 98 | |
| Surface Hardness (kgf) | | | | | | |
| Average | 39.1 | | 37.6 | | 34.9 | |
| Standard Deviation | 2.73 | | 2.54 | | 4.13 | |
| Core Hardness (kgf) | | | | | | |
| Average | 13.4 | | 12.7 | | 10.9 | |
| Standard Deviation | 1.58 | | 1.48 | | 1.93 | |
| Reduction of Consumption Rate of Foaming Agent | 0.7 | | 0.8 | | 1 | |
| Reduction of Comsumption Rate of Adhesive Auxiliary Agent | 0.6 | | 0.6 | | 1 | |

FIG.11
(A)
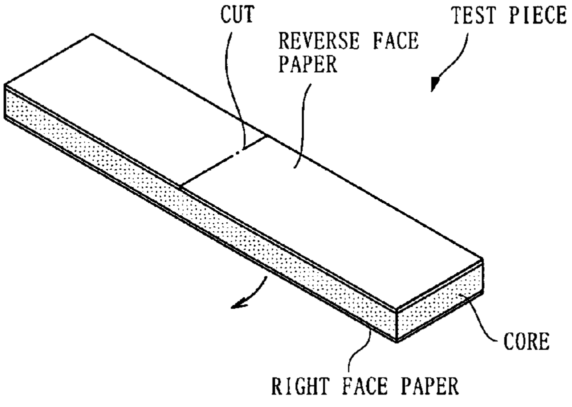
(B)
(C)
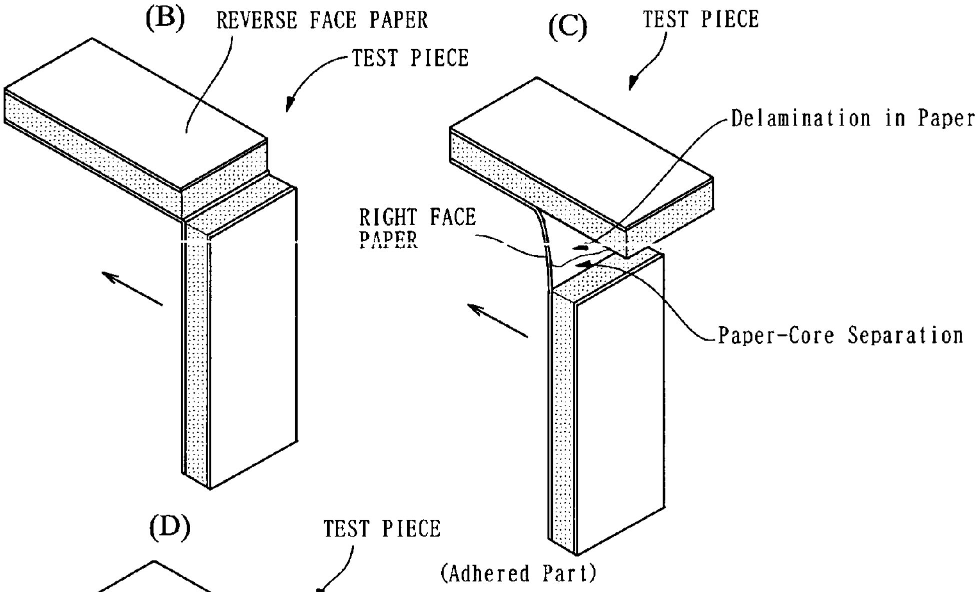
(D)
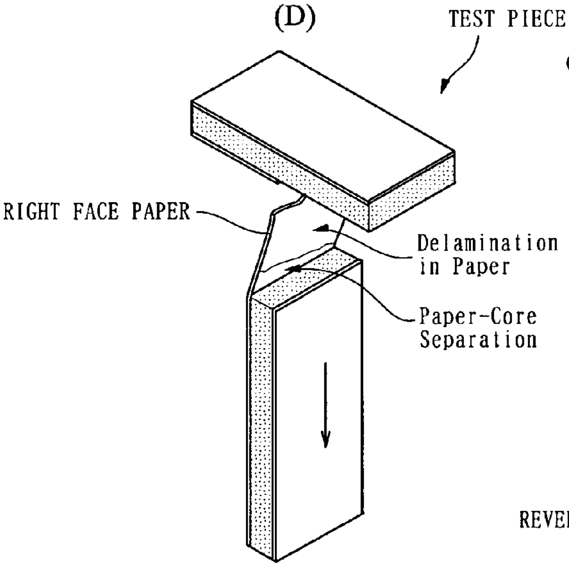
(E)
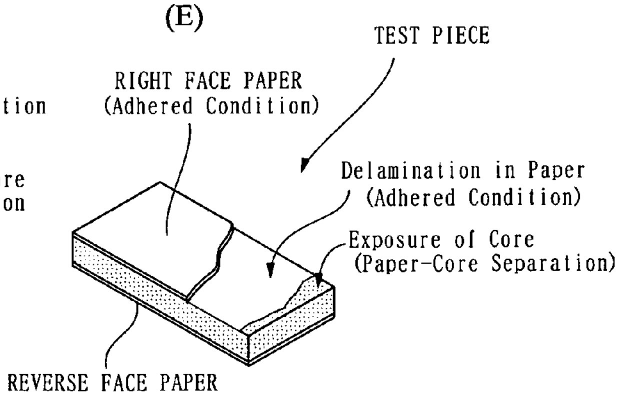

APPARATUS AND METHOD FOR FRACTIONATING GYPSUM SLURRY AND METHOD OF PRODUCING GYPSUM BOARD

CROSS-REFERENCE TO RELATED APPLICATIONS

This is a nationalization of PCT/JP03/011677 filed Sep. 12, 2003 and published in Japanese.

BACKGROUND OF THE INVENTION

1. Field of the Invention

The present invention relates to an apparatus and a method for fractionating gypsum slurry and a method of producing gypsum board, and more specifically, to such an apparatus and a method for fractionating the gypsum slurry from a mixer for mixing calcined gypsum and water, and a method of producing the gypsum board with use of the apparatus for fractionating the gypsum slurry.

2. Related Art

Gypsum boards having a gypsum core covered with sheets of paper for gypsum board liner are practically and widely in use for an architectural interior finish material from viewpoints of its advantageous fire-resisting or fire-protecting ability, sound insulation performance, workability, cost performance and so on. In general, a process of producing such a gypsum board comprises a mixing step of admixing a quantity of water and foam (foam for reducing the weight of gypsum board core) with ingredients for the gypsum board, such as calcined gypsum, adhesive auxiliary agent, set accelerator, additives, admixtures and so forth; a slurry pouring step of pouring the produced gypsum slurry of the mixing step between upper and lower sheets of paper for gypsum board liner; a forming step of generally shaping the sheets and slurry so as to have a predetermined configuration of board; a severing and drying step of severing the continuous belt-like form of gypsum board into green boards and forcibly drying them; and a cutting step of finally cutting each of the dried boards to have a predetermined size of the product. In addition to such a widely used gypsum board, a lath board, decorative gypsum board, gypsum sheathing board, reinforced gypsum board and so forth are known in the art as board materials for building construction to be produced in accordance with similar methods. These board materials are defined in JIS (Japanese Industrial Standard; JIS A6901), as being various kinds of board materials to be selectable in correspondence with their purpose of use and performance, and they are actually placed on the market of building construction materials.

FIG. 12 is a schematic side view illustrating an arrangement of a conventional gypsum board manufacturing machine. In FIG. 12, there is shown a part of the machine, in which the mixing step, the slurry pouring step and the forming step are carried out.

The gypsum board manufacturing machine is provided with a mixer A which prepares the slurry by mixing the aforementioned ingredients for the gypsum board. A thin, pin-type mixer is used as the mixer A, in a lot of gypsum board manufacturing plants. In general, this kind of mixer comprises a flattened cylindrical housing which defines a mixing area (mixing chamber), and a rotary disc to be rotated within the housing. In a central area of an upper cover of the housing, there are located a plurality of inlet ports which introduces the materials to be mixed, such as calcined gypsum, mixing water and foam, into the housing. The housing is provided in its peripheral zone with a discharging port for discharging the mixture therethrough. The upper cover or upper plate is provided with a plurality of upper pins depending therefrom down to the proximity of the rotary disc. The rotary disc has a plurality of lower pins vertically fixed thereon and extending up to the proximity of the upper cover. The upper and lower pins are radially alternately arranged. A rotary shaft and a driving device for rotating the disc are connected with the disc. The components fed into the housing are stirred and mixed by rotation of the disc in operation of the driving device, and moved radially outward on the disc by the action of centrifugal force, and then, discharged onto a sheet of paper for gypsum board liner from a chute F located in a peripheral portion of the housing, as the gypsum slurry S1. This kind of mixer is disclosed in, for instance, U.S. Pat. Publication No. 3,459,620, Japanese Patent Laid-Open Publications Nos. 8-25342, 2000-262882 and 2000-6137, and so forth.

In the technical field of manufacture of gypsum boards, efforts of long years have been made to further reduce the weight of gypsum board while keeping or improving the quality thereof. For example, in the forcible drying step during manufacture of gypsum boards, the drying rate of the gypsum board is, in general, relatively quick at an edge part or edge zone (an edge portion), in comparison with its widthwise center part. Therefore, the edge portion is apt to cause lack of strength, dryout, defective bonding between the gypsum core and the gypsum board liner paper, and the like, owing to excessive drying. In order to prevent such a phenomenon, the density of slurry at the edge portions of the gypsum board is generally set to be higher than the density of slurry at the center part thereof.

For making the density of the side edge portions of gypsum board higher, an agitator for slurry (gypsum slurry agitator B) independent of the aforementioned mixer is normally used, as shown in FIG. 12. A part of gypsum slurry prepared by the mixer is fractionated through a slurry fractionation port E disposed on a peripheral outer wall of the mixer housing, and is introduced into the gypsum slurry agitator B rotating at a high speed. The agitator B causes the foam to be broken or disappear so that the gypsum slurry with high density is obtained, and deposits the high density gypsum slurry S2 on a zone of the gypsum board liner paper corresponding to the edge portion of gypsum board. This type of gypsum slurry agitator is called a hard edge mixer, and employment of such a hard edge mixer makes it possible to form a high density (high specific gravity) core at the edge parts of gypsum board without making the density (specific gravity) of the center part of gypsum board higher. This kind of gypsum slurry agitator is disclosed, e.g., in U.S. Pat. Publication No. 4,279,673.

The gypsum slurry of the mixer is also fractionated through slurry fractionation ports E', E" disposed on the peripheral outer wall of the mixer, and it is fed to gypsum slurry agitators C, D for roll coaters G, H. The agitators C, D agitates the gypsum slurry to discharge the high-density gypsum slurry S', S" onto the gypsum board liner paper. Each of the roll coaters forms a thin layer of high-density slurry on the surface of the sheet for improving the adhesiveness between the gypsum core and the paper.

Further, a mixer disclosed in Publication of PCT International Application No. WO 97-23337 has an arrangement in which inlets for feeding materials to be mixed, except foam, are disposed in a center area of the mixer. The mixer prepares gypsum slurry without foam in the mixer, and discharges it through a main discharge outlet as a core stream. A part of the slurry in the mixer is extracted as an edge stream, through an auxiliary slurry discharge outlet disposed on a peripheral outer wall of the mixer. Foam is introduced into the core stream of slurry in vicinity of the main discharge outlet, so that a difference in the density of slurry is given between the core stream and the edge stream.

As set forth above, the slurry with high density is fed to the parts of the sheet corresponding to the edge portions of the gypsum board. In the conventional technique, problems have been indicated wherein excessively high-density slurry is fed to the edge portion, owing to excessive agitation in the gypsum slurry agitator and the like. Such a high density slurry results in exfoliation of the core due to surface cracking, which is caused between a high density core portion and a low density core portion, and difficulty of in-situ nailing or screwing in vicinity of an edge of the gypsum board. As practical countermeasures against excessive high density of the slurry, the foam has been excessively added to the mixer in estimation of defoaming action of the slurry agitator, or the foam is added to the slurry in the slurry agitator through a foam inlet provided on the slurry agitator. However, such countermeasures are in contradiction to the intention of equipment of the gypsum slurry agitator (breaking the foam) for making the density of slurry higher. In addition, this results in undesirable increase of the consumption rate (the dosage of additive per a single standard gypsum board) of foam or foaming agent.

Further, in the conventional mixer, a fractionation port of the gypsum slurry is provided on a peripheral outer wall of the mixer, independent of a discharge port for depositing the gypsum slurry on the center part of the gypsum board liner paper. The gypsum slurry fractionated through the fractionation port (fractionated slurry) is apt to extensively vary in its density, compared to the gypsum slurry discharged from the chute. Thus, centralized control of the slurry density cannot be carried out, and control of the slurry density is, in practice, very difficult to be performed.

Furthermore, a mass of set slurry, which blocks the flow of slurry, tends to be produced in the mixer and a slurry delivery conduit (which is also called, fractionated slurry conduit or slurry fractionation conduit). This kind of slurry mass has a nature of growing as the operating time proceeds. Accordingly, the flow rate of slurry flowing through the conduit is reduced during operation, and thus, a problem of reduction of fractionated slurry arises.

Actually, the high density slurry discharged by the slurry agitator may exhibit its density significantly exceeding the predetermined target value or extremely less than the target value, owing to additional dosage of foam, scattering of the slurry density and change of the slurry flow rate. This results in a condition that distinct difference in density is not observed between the high-density slurry and the low-density slurry, or the difference is reversed. Thus, it is necessary to practice a reliable control in the density of fractionated slurry and restrict change in the slurry flow rate, in order to avoid loss of adhesiveness between the core and the gypsum board liner paper, lack of mechanical strength at the edge portion of the gypsum board, and the like (that is, deterioration of quality of finished product), and in order to prevent the foam consumption rate from increasing.

It is an object of the present invention to provide an apparatus and method for fractionating gypsum slurry, which can surely control the density of the gypsum slurry to be fractionated from the mixer, which can restrict the change in the flow rate of the fractionated slurry, and which can reduce the consumption of foam or foaming agent.

It is another object of the present invention to provide a method of producing gypsum boards, which enables stable production of high quality gypsum boards with use of such an apparatus for fractionating gypsum slurry.

SUMMARY OF THE INVENTION

According to the present apparatus and method for fractionating gypsum slurry, it is possible to surely control the density of the gypsum slurry to be fractionated from the mixer, restrict the change in the flow rate of the fractionated slurry, and reduce the consumption of foam or foaming agent.

Further, according to the present method of producing gypsum board, it is possible to surely control the density of the gypsum slurry to be fractionated from the mixer and restrict the change in the flow rate of fractionated slurry, whereby the deterioration of quality of the final products, such as inferior adhesiveness or insufficient mechanical strength of the edge portions of the gypsum board, is avoidable, and also, the consumption of foam or foaming agent can be reduced.

As a result of the present inventors' research for accomplishing the aforementioned objects, the present inventors noted that the density and pressure of the gypsum slurry can be most stable in a hollow connector section and a chute section which extract the slurry from the mixer to discharge it to the center part of a gypsum board liner paper. The inventors found out that fractionation of slurry in these sections allows the slurry to be continuously fractionated in a stable condition in regard to the density and flow rate of the slurry, and enables centralized control of the density and flow rate of the slurry. The present invention is achieved, based on such acquirement of knowledge, and the present invention is:

an apparatus for fractionating gypsum slurry from a mixer for gypsum slurry, which is provided on the mixer, the mixer being arranged so that calcined gypsum and water are mixed in a mixing area inside of a housing for preparation of the gypsum slurry, and that the gypsum slurry continuously flows from a hollow connector section into a chute section to be discharged through a slurry discharge port of the chute section: comprising a slurry fractionation port in fluid communication with a slurry delivery conduit, the slurry fractionation port being disposed at said chute section and/or said hollow connector section so as to fractionate the gypsum slurry in said chute section and/or said hollow connector section.

Preferably, the apparatus is provided with valve means for opening and closing the slurry fractionation port, and a casing which encloses the fractionation port and the valve means. The casing has a slurry delivery port. The slurry delivery conduit is connected to the slurry delivery port and the conduit is in fluid communication with the fractionation port through an internal area of the casing. It is preferred that a driving device for driving the valve means, such as a fluid-actuated cylinder device, is provided and the valve means is operated under control of drive control means.

More preferably; a foam supply port is provided on the chute section and/or the hollow connector section, and foam or foaming agent for adjusting the density of slurry is added to the gypsum slurry effluent from the mixer. The foam supply port is desirably positioned between the slurry fractionation port and the slurry discharge port of the chute section. Both of the fractionation port and the foam supply port may be positioned on the chute section. In such a case, it is desirable to dispose the slurry fractionation port, upstream of the foam supply port in a direction of the gypsum slurry flow. It is preferred that the fractionation port is disposed on a top wall of the chute section and/or the hollow connector section.

According to the present invention, the gypsum slurry after preparation is fractionated from the chute section and/or the hollow connector section which are stable in the density and pressure of the slurry, and therefore, a standard deviation of the density of the fractionated slurry, i.e., scattering of the slurry density, is considerably reduced in comparison with that of the fractionated slurry conventionally fractionated from a peripheral outer wall of the mixer. Further, the flow rate of the slurry delivery conduit is stable since the chute section and the hollow connector section have relatively high slurry pressures. Stability of the density and flow rate of the fractionated slurry allows control of the density and flow rate of the slurry to be facilitated. Therefore, addition of the foam or foaming agent can be effectively performed so that the consumption rate of the foam or foaming agent is reduced.

According to the present invention, a method for fractionating gypsum slurry with use of the aforementioned apparatus is provided as follows:

(1) a part of the gypsum slurry in the chute section and/or the hollow connector section is delivered through the fractionation port to the slurry delivery conduit under the pressure of the gypsum slurry;

(2) the part of the gypsum slurry limited in the content of foam or foaming agent is delivered through the fractionation port to the slurry delivery conduit;

(3) a fluid passage between the slurry delivery conduit and the chute or hollow connector section is periodically closed or opened by closing and opening operation of the valve means so as to avoid growth of mass of set slurry in the fluid passage of the fractionated slurry; or (4) the pressure of the slurry fractionated from the fractionation port is controlled by the valve means.

From another aspect of the present invention, the present invention provides a method for producing gypsum boards with use of a mixer for mixing calcined gypsum and water in its mixing area to prepare gypsum slurry, and an apparatus for fractionating the gypsum slurry to be fed to a slurry delivery conduit: comprising a slurry preparing step of feeding the calcined gypsum and water into the mixer to mix them therein for preparation of the gypsum slurry and displacing the gypsum slurry effluent through a hollow connector section into a chute section;

a slurry fractionating step of causing a part of the slurry effluent from said mixing area to be fractionated in said chute section and/or said hollow connector section as fractionated slurry, and feeding the fractionated slurry through said conduit to a roll coater and/or a side edge portion of a sheet of paper for gypsum board liner; and a slurry discharging step of discharging a remainder of the gypsum slurry, from which the fractionated slurry has been fractionated, through a discharge port of the chute section onto a center part of the sheet of paper for gypsum board liner, wherein a core of an edge portion of the gypsum board and/or an interface portion between a core and the sheet of paper for gypsum board liner is formed by said fractionated slurry.

In such an arrangement, the prepared gypsum slurry is fractionated after flowing out from the mixing area, and the core at the edge portion of the gypsum board, or the interface portion of the core in contact with the gypsum board liner paper is formed by the fractionated slurry which is stable in the density and the flow rate. Therefore, it is possible to stably produce high quality gypsum boards. Preferably, the foam or foaming agent for regulating the density of slurry is added to the remainder of gypsum slurry after the slurry has been already fractionated. If desired, the fractionated slurry containing the foam is agitated by a slurry agitator.

BRIEF DESCRIPTION OF THE DRAWINGS

FIGS. 7A and 7B are block flow diagrams of slurry feeding system showing manners of supplying foam;

FIGS. 9A and 9B respectively are a fragmentary sectional side view and a block flow diagram showing an example of the mixer provided with the apparatus for fractionating slurry;

FIG. 10 is an illustration by tables, which shows results of measurements of the slurry density and results of the quality evaluation of gypsum boards;

FIGS. 11A-11E are explanatory perspective views illustrating a way of conducting an adhesiveness test.

DETAILED DESCRIPTION OF THE PREFERRED EMBODIMENTS

With reference to the attached drawings, a preferred embodiment of the present invention is described hereinafter.

Figure 1:
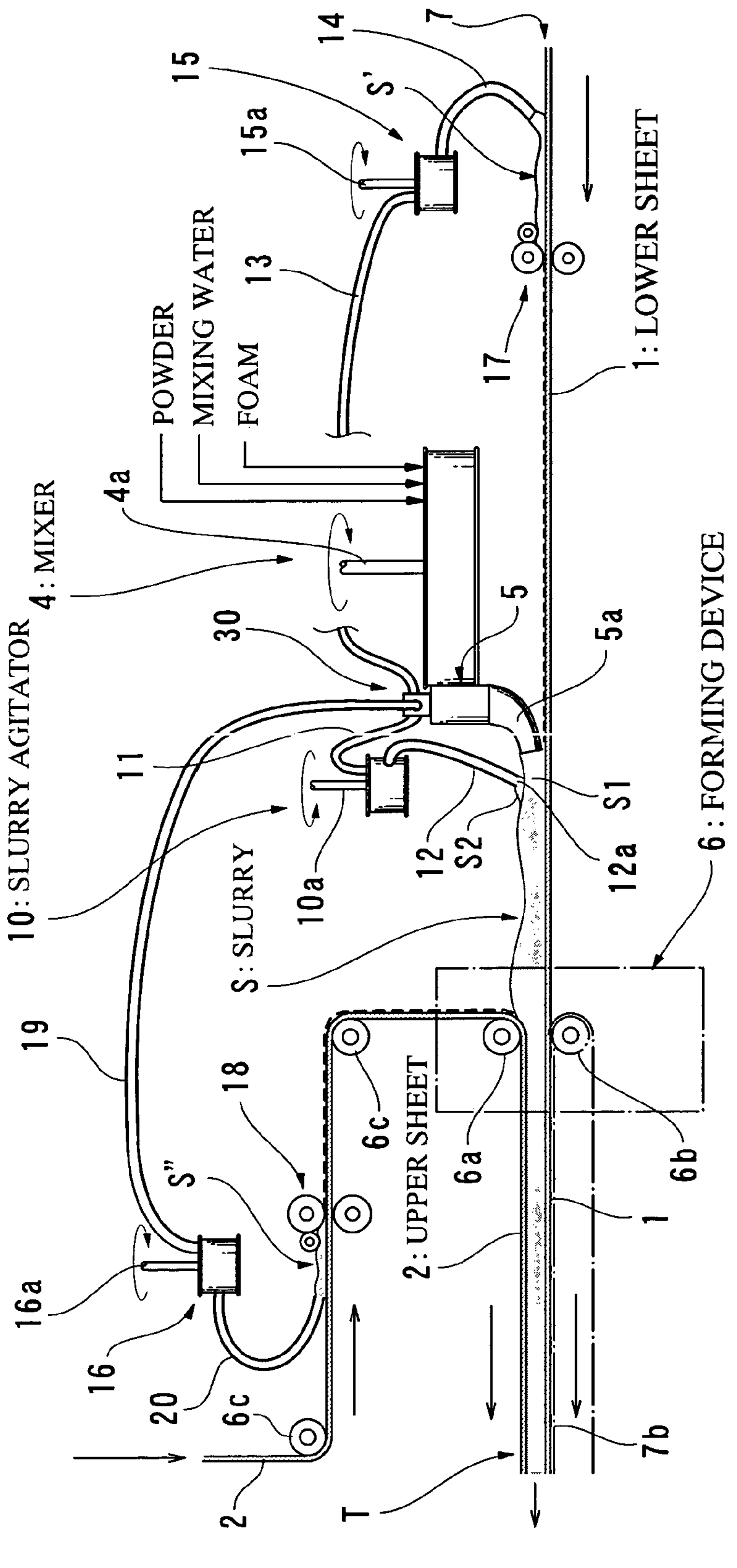
FIGS. 1 and 2 are a side view and a plan view schematically illustrating an arrangement of a gypsum board manufacturing machine.
Figure 2:
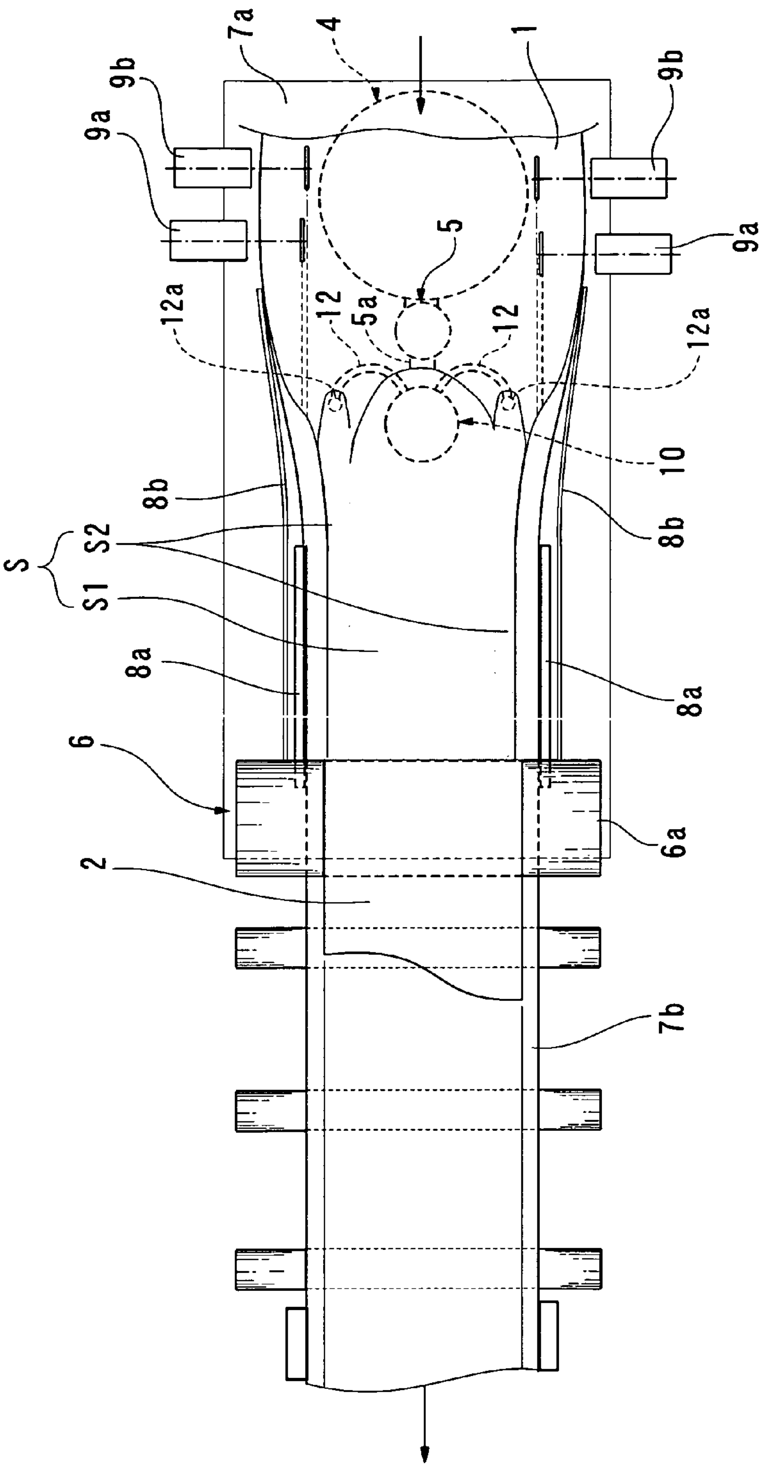

In FIGS. 1 and 2, an arrangement of a gypsum board manufacturing machine is schematically illustrated. A sheet of liner paper for a right face of gypsum board is supplied to a conveyance line 7 of the machine as a lower sheet 1. The sheet 1 travels on the line 7 in a direction of conveyance (the direction of an arrow). A roll coater 17 is provided on the conveyance route of the sheet 1. A part of gypsum slurry of a mixer 4 is introduced into a slurry agitator 15 through a slurry delivery conduit 13. The agitator 15 agitates the gypsum slurry for breaking or defoaming foam contained in the slurry so as to obtain the slurry with high density. The high-density slurry S' of the agitator 15 is fed to the sheet 1 by means of a high-density slurry discharge conduit 14, on an upstream side of the roll coater 17. A thin layer of the slurry S' (shown by a dotted line) is formed on the upper surface of the sheet 1 by the roll coater 17.

As shown in FIG. 2, right and left scores are formed on the sheet 1 by scoring devices 9*a*, 9*b*, and side edge portions of the sheet 1 are folded by right and left guide members 8*a*, 8*b* and so forth, so that the side edge portions of the sheet 1 are configured to be in a form of edge portions of the gypsum board, while moving on a conveyor table 7*a* of the conveyance line 7 in the direction of conveyance. A mixer 4, which is a pin-type of mixer, is positioned above the conveyance line 7, and a slurry agitator 10 is positioned forward of the mixer 4 (forward in the conveyance direction). As illustrated in FIG. 1, powder materials including calcined gypsum, adhesive agent, additives and admixtures; foam (foaming agent); and liquid material (mixing water) are fed to the mixer 4. The mixer 4 rotates an internal disc (not shown) with rotation of a driving shaft 4*a* so that the powder, foam and liquid materials are mixed with each other and discharged to a center part of the sheet 1 through a chute section 5 and a slurry discharge conduit 5*a*, as being gypsum slurry S1. The chute section 5 is also called, a slurry supply conduit or a canister.

A part of the gypsum slurry of the mixer 4 is introduced into a slurry agitator 10 through a slurry delivery conduit 11. The agitator 10 agitates the slurry for breaking or defoaming the foam in the slurry so as to make the density of the slurry higher. The agitator 10 constitutes a hard edge mixer, which feeds the high density slurry to side edge zones of the sheet 1 corresponding to the edge portions of the gypsum board. The high density slurry, which has been subjected to foam-breaking or defoaming action of the agitator 10, is delivered to a pair of high density slurry discharge conduits 12, and discharged to the side edge parts of the sheet 1 (edge portions on both sides) from discharge ports 12*a* of the conduits 12. The gypsum slurry S (S1:S2) deposited on the sheet 1 from the conduits 5*a*, 12 is conveyed on the conveyance line 7 together with the sheet 1, and reaches a forming device 6 provided with a pair of upper and lower forming rollers 6*a*, 6*b*.

A sheet of liner paper for a reverse (back) face of gypsum board is supplied to a conveyance line 7 as an upper sheet 2. The upper sheet 2 is successively fed to the forming rollers 6*a*, 6*b* along a predetermined route by guidance of diverting rollers 6*c*. The rollers 6*a* divert the sheet 2 toward the conveyance direction so that the sheet 2 is overlaid on the slurry S. A roll coater 18 analogous to the aforementioned roll coater 17 is provided on the route of the upper sheet 2. A part of gypsum slurry of the mixer 4 is introduced into a slurry agitator 16 through a slurry delivery conduit 19. The agitator 16 agitates the gypsum slurry to break or defoam the foam contained in the slurry for making the density of the slurry higher. The high density slurry S" of the agitator 16 is fed onto the upper sheet 2 from a high density slurry discharge conduit 20 on an upstream side of the roll coater 18, which forms a thin layer of the high density slurry S" (shown by a dotted line) as in the aforementioned roll coater 17.

The slurry agitators 10, 15, 16 are arranged to rotate an internal rotor (not shown) with rotation of driving shafts 10*a*, 15*a*, 16*a* so as to break or defoam the foam of the slurry. Details of the internal structures of the agitators 10, 15, 16 are described in Japanese Patent Application No. 2002-274588 of the present applicant, and therefore, further detailed descriptions thereon are omitted. Also, as a type of roll coater similar to the roll coater 17, 18 is disclosed in Japanese Patent Laid-Open Publication No. 8-112808 of the Japanese Patent Application filed by the present applicant, further detailed descriptions thereon are omitted with reference to this publication.

The sheets 1,2 and the slurry S are formed to a three-layered and belt-like continuous formation by the forming device 6. The layered formation travels on the conveyor belt 7*b* of the conveyance line 7 toward a severing device (not shown). Simultaneously, setting reaction of the slurry S progresses. The severing device is located on the conveyance line and the layered formation is successively severed into boards (green boards), each having a predetermined length. The green boards are inverted by an inverter (not shown) and then, charged into a dryer (not shown) to be subjected to forcible drying therein, and thereafter, they are finally cut to have a predetermined product size in a cutting step (not shown) and then, delivered therefrom as gypsum board products.

Figure 3:
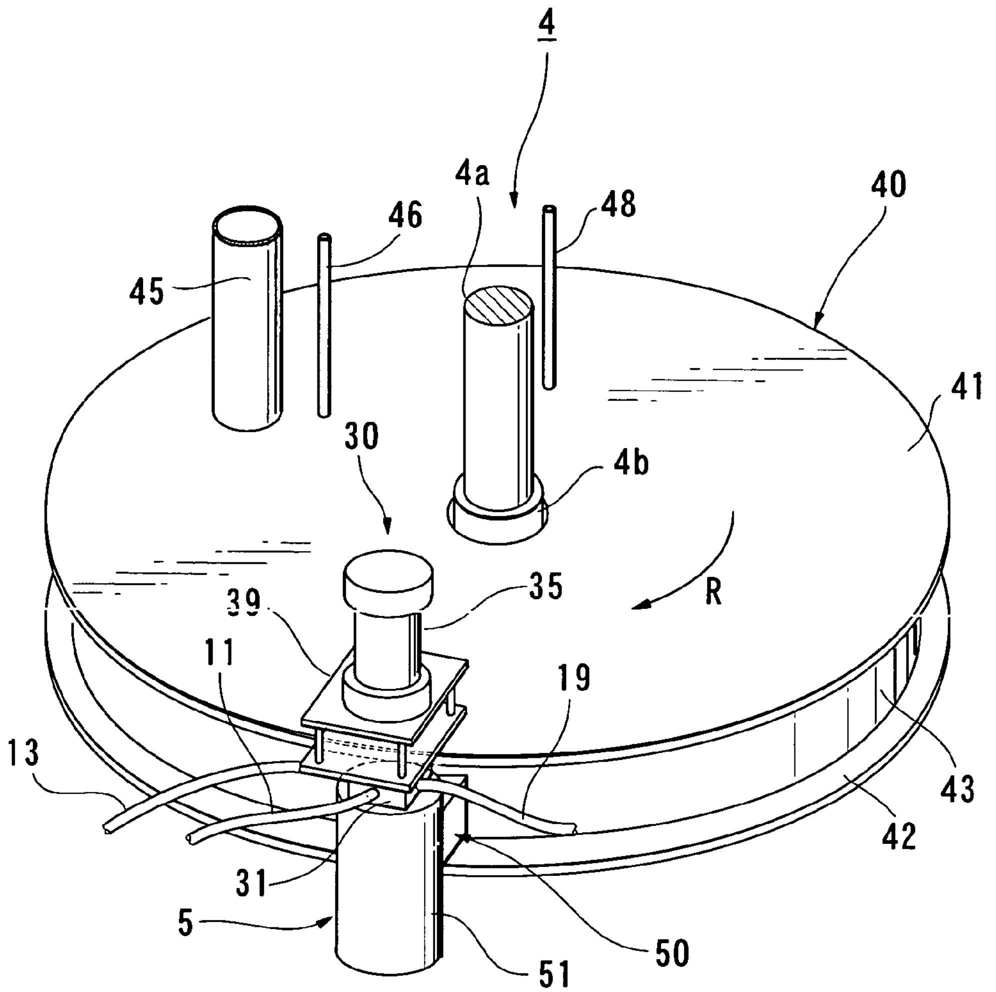
FIGS. 3, 4 and 5 are a perspective view, a plan view and a fragmentary sectional side view showing arrangements of a mixer, a hollow connector section and a chute section.
Figure 4:
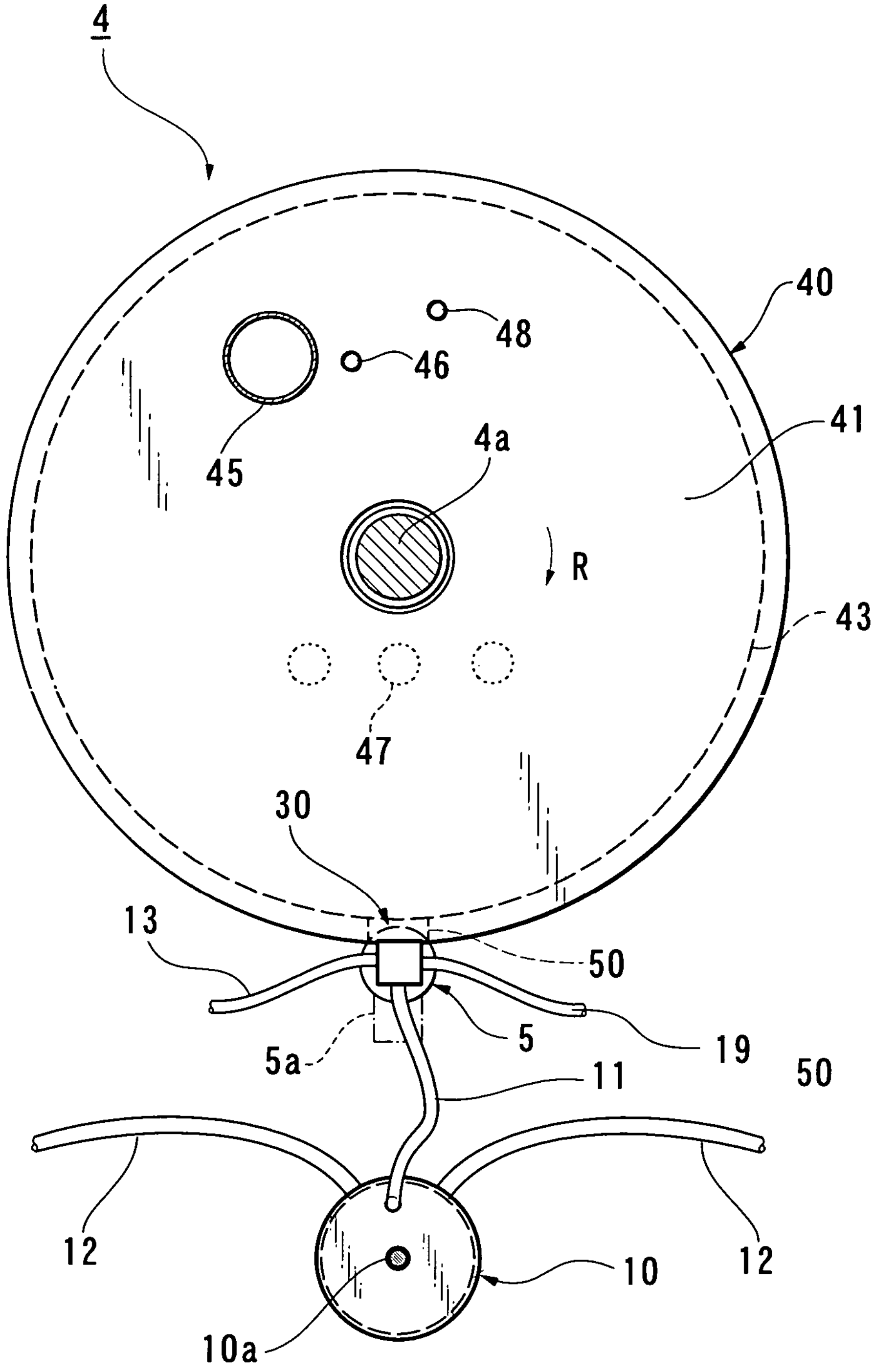
Figure 5:
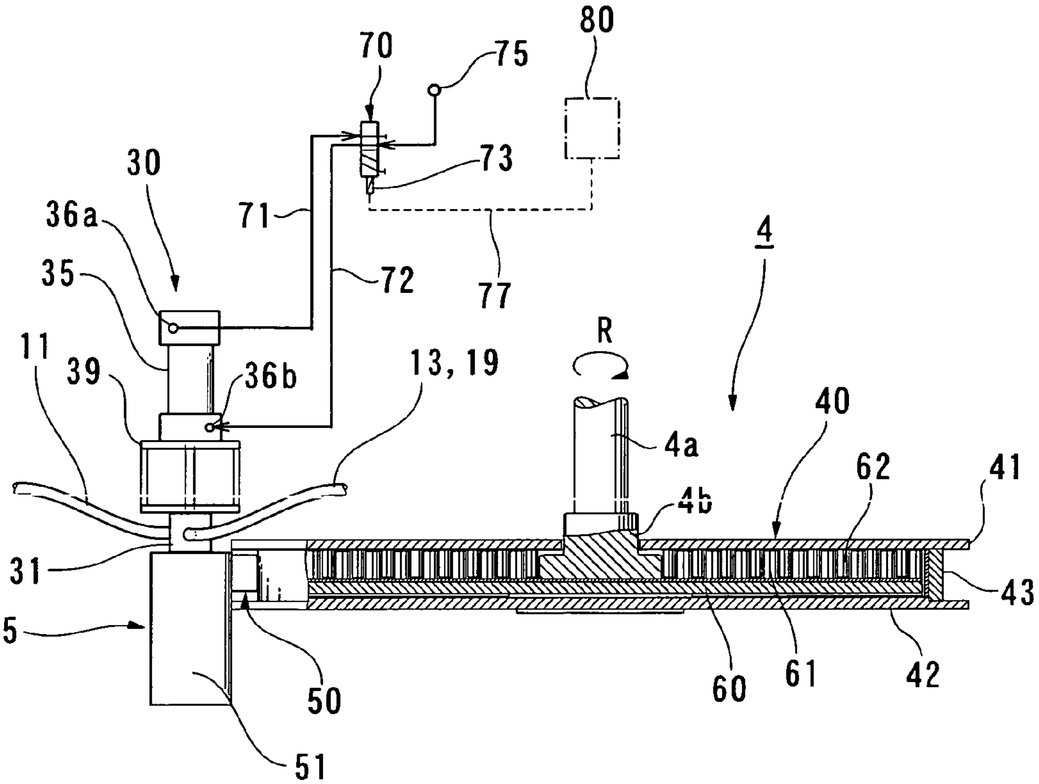
Figure 6:
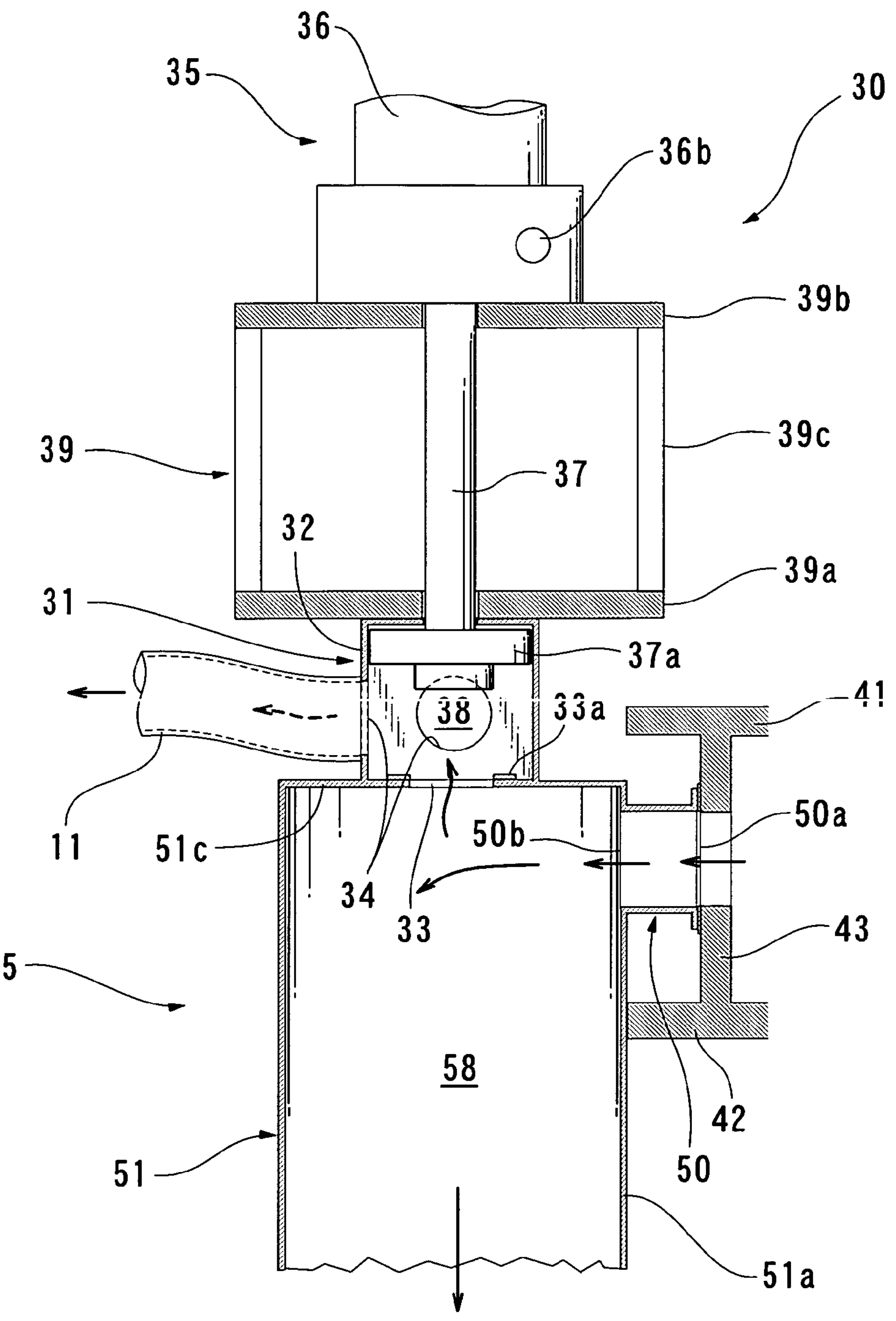
FIG. 6 is a vertical cross-sectional view, which illustrates internal structures of the hollow connector section, the chute section and an apparatus for fractionating slurry.

Arrangements of the mixer 4, the hollow connector section 50 and the chute section 5 are illustrated in FIGS. 3, 4 and 5, and internal structures of the hollow connector section 50, the chute section 5 and an apparatus for fractionating slurry 30 are illustrated in FIG. 6.

The mixer 4 has a flattened cylindrical housing 40, which is provided with an upper plate (top cover) 41 and a lower plate (bottom cover) 42 which are vertically spaced a predetermined distance. The mixer 4 also has an annular outer wall 43 which is jointed to peripheral zones of the upper and lower plates 41, 42. An enlarged bottom portion 4*b* of a rotatable vertical shaft 4*a* extends through the upper plate 41. The shaft 4*a* is connected with a rotary drive device, such as an electric drive motor (not shown), by means of a variable speed device, such as a variable speed gear mechanism or belt assembly (not shown).

A powder conduit 45, a water supply conduit 46, pressure regulator means 47 (shown by dotted lines in FIG. 4) and a foam feeding conduit 48 are connected to the upper plate 41 in predetermined positions. The powder conduit 45 feeds the gypsum board powder materials to be mixed; the water supply conduit 46 supplies a predetermined quantity of mixing water; pressure regulator means 47 restricts increase of the internal pressure; and the foam feeding conduit 48 feeds a predetermined quantity of foaming agent. The foam for regulating the density of calcined gypsum slurry is mixed into the components in the mixer 4 by supply of the foaming agent from the conduit 48.

As shown in FIG. 5, a circular rotary disc 60 is rotatably mounted in the housing 40, and the enlarged bottom portion 4*b* of the rotary shaft 4*a* is fixedly secured to a center part of the disc 60. The disc 60 is rotated integrally with the shaft 4*a* in a clockwise direction as indicated by an arrow R. Lower pins 61 are vertically mounted on the upper surface of the disc 60, and upper pins 62 depend from the upper plate 41. The lower pins 61 pass through the spaces between the upper pins 62 when the pins 61 are moved in the direction R with rotation of the disc 60. The mixer 4 has structures as described in Japanese Patent Laid-Open Publications Nos. 8-25342, 2000-262882, 2000-6137 and so forth, which are publications of Japanese patent applications filed by the present applicant. Therefore, detailed descriptions on the internal structures of the mixer 4 are omitted with reference to those publications.

As shown in FIGS. 3 and 6, the hollow connector section (slurry extracting section) 50 is connected to the peripheral outer wall 43. An inlet end 50*a* of the connector section 50 opens to the internal mixing area of the mixer 4, and an outlet end 50*b* of the connector section 50 is connected to an peripheral outer wall 51*a* of the chute 51. A lower outlet end (not shown) of the peripheral outer wall 51*a* constitutes a slurry discharge port of the chute section 5. The chute 51 has a restriction (not shown) which provides a fluid resistance of the fluid flowing down in an internal area 58 of the chute. In this embodiment, a guide tube is further connected with the wall 51*a*, as the slurry discharge conduit 5*a*, for conducting the slurry to a predetermined area of the sheet 1 (the center part thereof). The tube is made of rubber, synthetic resin or the like.

A top end portion of the chute 51 is closed by a horizontal top wall 51*c*, on which a slurry fractionating device 31 of the apparatus for fractionating slurry 30 is installed.

The apparatus for fractionating slurry 30 is constituted from the slurry fractionating device 31 and a fluid-actuated cylinder device 35 positioned right above the chute 51. A cylinder support frame 39, which vertically supports the cylinder device 35, is mounted on a machine frame (not shown) of the gypsum board manufacturing machine or the housing 40 of the mixer 4. The frame 39 has a bottom plate 39*a* and a top plate 39*b*. The plates 39*a*, 39*b* are connected with each other by means of vertical connection rods 39*c*, spaced apart a predetermined distance from each other. The plate 39*a* is connected to an upper surface of a casing 32 of the device 31. The top plate 39*b* is connected to a lower end portion of a cylinder body 36.

A movable cylinder rod 37 of the cylinder device 35 depends through an open space in the frame 39 and extends through a top wall of the casing 32. The rod 37 extends into the device 31 and a circular valve body 37*a* is integrally secured to a lower end of the rod 37. A circular fractionation port 33 is disposed in position opposing the valve body 37*a*, so that the internal area 58 of the chute and an internal area 38 of the slurry fractionating device can be in fluid communication with each other through the port 33. The port 33 and the rod 37 are concentrically positioned so that the center of the port 33 lies on a center axis of the rod 37. The port 33 is formed on a top wall 51*c* of the chute 51. An annular valve seat 33*a*, on which the valve body 37*a* can be seated, is disposed on an opening edge of the port 33. In FIG. 6, a fractionating position of the apparatus 30 is illustrated in which the valve body 37*a* is unseated from the valve seat 33*a*. In this fractionating position, the cylinder device 35 retracts the rod 37 in the cylinder body 36 and the valve body 37*a* is raised up to its uppermost position.

Slurry delivery ports 34 are formed on side walls of the casing 32 and upstream ends of the slurry delivery conduits 11, 13, 19 are connected to the ports 34, respectively. In the fractionating position of the device 31, each of fluid passages of the conduits 11,13,19 is in fluid communication with the internal area 58 of the chute through the internal area 38 of the device 31.

As the cylinder device 35 extends the rod 37 from the cylinder body 36 so as to move the valve body 37*a* down to its lowermost position, the valve body 37*a* seats on the valve seat 33*a*, so that the device 39 is changed over to take its closing position. In this closing position, fluid communication between the internal areas 38, 58 is shut off. Therefore, the slurry of the chute section 5 is not delivered to the fluid passages of the conduits 11,13,19. In a case where the valve body 3*a* is positioned in an intermediate position between the uppermost and lowermost positions under variable control of the rod position, the pressure loss of the slurry passing through the device 31 is adjusted in accordance with the position of valve body. Therefore, the slurry delivered to the respective fluid passages of the conduits 11,13,19 is controlled in its fluid pressures by the position of the valve body.

A fluid control circuit constituting an operation control system of the cylinder device 35 is schematically illustrated in FIG. 5. The cylinder body 36 is provided with working fluid ports 36*a*, 36*b*, which are connected with a two-position control type of electromagnetic valve 70 by means of fluid conduits 71, 72. The valve 70 is selectively changed over to its first position (rod retraction position) and its second position (rod extension position). In the first position, the conduit 71 is exhausted to the atmosphere and the conduit 72 is in fluid communication with a main conduit for working fluid 75, whereas in the second position, the conduit 71 is in fluid communication with the main conduit 75 and the conduit 72 is exhausted to the atmosphere. An electromagnetic solenoid 73 of the valve 70 is connected with a control unit 80 by means of a control signal line 77. In this embodiment, the cylinder device 35 is a pneumatic cylinder device and compressed air is used as the working fluid.

The operation of the apparatus 30 is described hereinafter.

In operation, the starting materials including the powder materials for gypsum board, the mixing water, the foaming agent and so forth are successively fed to the mixer 4 through the powder conduit 45, the water supply conduit 46 and the foam feeding conduit 48. The mixer 4 causes the disc 60 to rotate by means of operation of the driving device so that these materials are stirred and mixed with each other. The gypsum slurry in the mixer 4 moves radially outward on the disc 60 under the action of the centrifugal force, and enters the chute 51 through the hollow connector section 50.

In a usual production process of gypsum boards, the slurry agitators 10, 15, 16 are in operation, and therefore, the valve 70 is kept in its first position (rod retraction position) and the valve body 37*a* is kept in the fractionating position (FIG. 6). The gypsum slurry flows into the chute 51 through the outlet end 50*b* of the connector section 50 under the high displacement pressure of the mixer 4. The slurry impinges against the wall surface of the internal area 58 opposing the outlet end 50*b* and stagnates therein, and then, flows down in the area 58 to be discharged onto the lower sheet 1 through the slurry discharge conduit 5*a* (FIG. 1). A part of gypsum slurry flows into the internal area 38 of the slurry fractionating device through the fractionation port 33 under the internal pressure (fluid pressure) of the internal area 58, and it is delivered to the respective conduits 11,13, 19. The cross-sectional area of the fluid passage in the connector section 50; the opening areas of the inlet and outlet ends 50*a*, 50*b*; the cross-sectional area, the fluid resistance and the volume of the internal area 58; the location, the opening area and the configuration of the fractionation port 33; and so forth, are suitably predetermined in consideration of the balance of slurry flow rates and the balance of pressures in the whole slurry feeding system including the conduits 11,13, 19. Accordingly, each of the conduits 11,13,19 can ensure the required slurry flow rate.

The gypsum slurry flowing through the conduits 11,13,19 into the slurry agitator 10,15,16 is agitated with rotation of the rotor in the agitators 10,15,16. The slurry with high density is obtained by breaking or defoaming the foam in the slurry. The slurry of the agitators 10,15,16 is fed to the lower sheet 1 and the roll coaters 17,18 through the discharge conduits 12,14,20 respectively, as the slurry with high density.

When the supply of slurry to the agitators 10,15,16 is ceased, the valve 70 is changed over to the second position (rod extension position). The valve body 37*a* descends to its lowermost position to be seated on the valve seat 33*a*, so that the fluid communication between the internal areas 38, 58 is shut off.

In FIGS. 7A and 7B, there are illustrated manners of feeding the foaming agent to the gypsum slurry feeding system.

As shown in FIG. 7A, the foaming agent for reducing the weight of slurry is introduced into the mixer 4, in which the foam is mixed with the powder materials, the mixing water and so forth. The slurry mixed with the foam flows through the connector section 50 into the chute section 5. As previously described, the most of the gypsum slurry is fed onto the lower sheet 1, and a part thereof is fractionated by the apparatus 30 and fed to the slurry agitators 10, 15, 16. The slurry fed to the agitators 10, 15, 16 increases its density by the foam-breaking or defoaming action of the agitators 10, 15, 16, so that the slurry is regulated to have a predetermined specific gravity.

The slurry displacement pressure of the mixer 4 acts on the internal area 58 of the chute section 5, and the internal pressure in the area 58 is stable in a relatively high pressure. Therefore, the apparatus for fractionating slurry 30 fractionates from the chute section 5, a constant quantity of gypsum slurry under a constant pressure, and delivers it to the agitators 10, 15, 16 through the slurry delivery conduits 11, 13, 19.

The density control of the gypsum slurry in the internal area 58 of the chute enables a centralized control of the density, with respect to the slurry fed from the chute section 5 to the lower sheet 1 and with respect to the slurry fed from the mixer 4 to the agitator 10,15, 16. Particularly, the density of gypsum slurry in the area 58 is less changeable with time and it is stable, compared to the density of slurry at the conventional slurry fractionation port (which is disposed on the peripheral outer wall 43 of the mixer 4). Accordingly, it is possible to surely control the density of slurry. This enables effective addition of foam, and therefore, makes it possible to reduce the dosage of foaming agent. Further, in a conventional manner, an excessive amount of adhesive auxiliary agent has been added to the slurry, since reduction of adhesiveness has been estimated which results from change of the slurry density. However, it is possible to eliminate such an excessive addition of the adhesive auxiliary agent.

In addition, according to the aforementioned arrangement of the apparatus 30, it is possible to control the cylinder device 35 in such a manner that the cylinder device 35 is periodically operated. This allows the valve 70 to be periodically changed over to either of the first and second positions during operation of the slurry feeding system, whereby the fluid passage between the areas 38, 58 can periodically close or open. Similarly to the slurry in the mixer and the slurry delivery conduit, the slurry may gradually produces a thin layered mass of set slurry blocking the flow of slurry, even in the vicinity of the edge portion of the fractionation port and the vicinity of the valve body having a relatively high pressure. However, such a thin layered mass of set slurry is periodically removed by closing and opening operation of the valve means 33*a*, 37*a*. Therefore, the flow rate of slurry of the area 38 can be prevented from decreasing during a long term operation, whereby the quantity of fractionated slurry is stabilized for a long term of time. Meanwhile, as the fractionation of slurry is temporarily blocked by shutting the communication between the areas 38, 58, the discharge rate of the conduits 5*a*, 12, 14, 20 may be changed transitionally. However, the shutting time of the valve means 33*a*, 37*a* is set to be a very short term of time so as not to excessively change the discharge rate, and the time interval of closing operation of the valve means is set to be a suitable time interval, in consideration of the setting time of slurry and so forth. Therefore, the delivery rate of slurry can be substantially stabilized.

In FIG. 7B, a modification of the position for adding the foam is exemplified.

Figure 8:
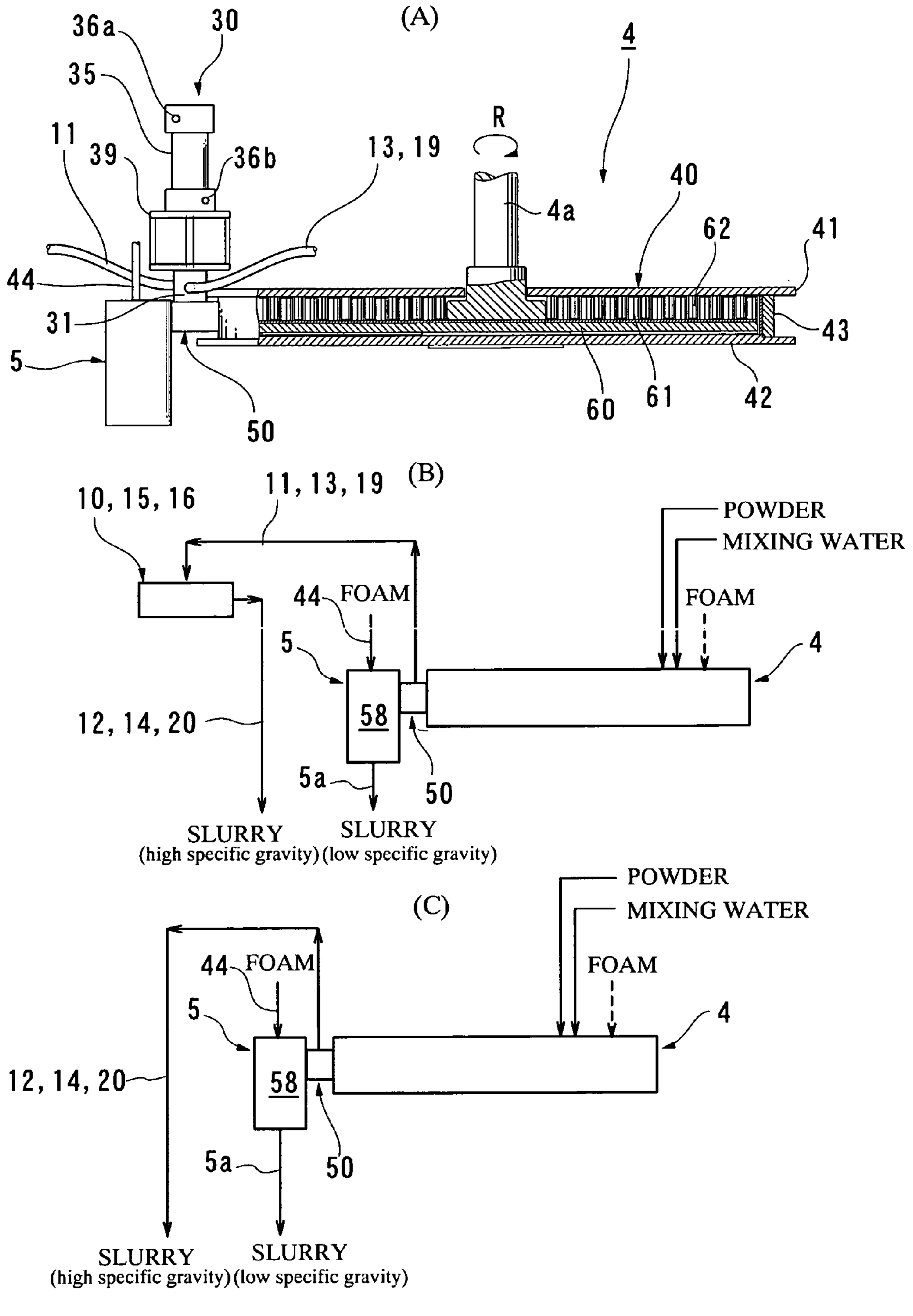
FIG. 8A is a fragmentary sectional side view and FIGS. 8B and 8C are block flow diagrams showing a modification of the apparatus for fractionating slurry.

As previously described, the gypsum slurry to be fed to the agitators 10, 15, 16 is fractionated by the apparatus 30. Therefore, the position for adding the foam can be set to be in the hollow connector section 50 as shown in FIG. 7B. The foam mixed into the slurry of the section 50 is not subjected to the mixing action in the mixer 4, and therefore, the foam is fed to the chute section 5 without loss of the foam resulting from the foam-breaking or defoaming action in the mixer 4. According to such an arrangement, the dosage of foaming agent can be determined without consideration of the loss of the foam in the mixer 4, and therefore, the dosage of foaming agent can be reduced (reduction of the incremental dosage), in comparison with the dosage thereof in the conventional manner (the dosage of foaming agent has been increased in consideration of the loss of the foam in the mixer 4). The foam may be introduced into the mixer 4 partially or additionally, as shown by a broken line in FIG. 7B. In FIGS. 8A-8C there are shown alternative embodiments of the apparatus 30.

In the aforementioned embodiment, the apparatus 30 is positioned right above the chute section 5, but the apparatus 30 may be positioned on a side wall of the chute section 5. Further, as shown in FIGS. 8A-8C, the apparatus 30 may be arranged to fractionate the slurry from the hollow connector section 50 wherein the apparatus 30 is positioned on the upper side of the connector section 50. If desired, it is possible to arrange the apparatus 30 on a side wall or the underside of the connector section 50.

In the embodiments as shown in FIGS. 8A and 8B, the slurry fractionating device 31 is fixed on a horizontal top wall of the connector section 50, and the cylinder device 35 is connected to the upper side of the device 31 in series. In the connector section 50, the device 31 fractionates the slurry which is flowing from the mixing area of the mixer 4 to the chute section 5, and delivers the slurry to the conduits 11, 13, 19.

The foam feeding conduit 44 is connected to the chute section 5 so that the foaming agent is introduced into the chute section 5. The slurry with relatively high density, which does not have the foam mixed therein, is fed to the agitator 10, 15, 16. The slurry with relatively low density, which has the foam mixed therein, is fed to the center part of the lower sheet 1 through the slurry discharging conduit 5*a* (FIG. 1). According to such an arrangement, the dosage of foaming agent can be determined without taking into consideration the foam-breaking or defoaming action in the agitators 10, 15, 16. Therefore, the dosage of foaming agent can be further reduced. If desired, a relatively small quantity of foam may be further mixed into the slurry in the mixing area of the mixer 4, as shown by a broken line in FIG. 8B.

If desired, the high density slurry without the foam mixed therein may be directly fed to a predetermined portion of the sheet 1 and the roll coaters 17,18, as illustrated in FIG. 8C. In such an arrangement, the slurry agitators 10, 15, 16, which break or defoam the foam for the higher density of the slurry by agitating the slurry, are omitted. If necessary, a relatively small quantity of foaming agent is further introduced into the mixing area of the mixer 4, as shown by a broken line in FIG. 8C.

Examples of the apparatus for fractionating slurry according to the present invention are described hereinafter.

FIGS. 9A and 9B show the mixer 4 provided with the apparatus 30.

The apparatus 30 as illustrated is located right above the chute section 5 as previously described. The foam feeding conduit 44 is connected to the chute section 5 and the foam feeding port of the conduit 44 is positioned so as to introduce the foaming agent into the slurry on the downstream side of the fractionation port 33 (FIG. 6). The conduit 44 feeds the foaming agent to the slurry which has entered the chute section 5 from the hollow connector section 50. A foam feeding conduit 44' is further connected to the connector section 50 and a foam feeding port of the conduit 44' is positioned for feeding a proper quantity of foaming agent into the connector section 50. The conduit 44' introduces the foaming agent into the slurry which is flowing from the mixer 4 into the chute section 5. The slurry delivery conduit 11 connecting the apparatus 30 with the agitator 10 has a branch portion 22. A pair of branch conduits 12' for distributing the slurry to the side edge portions of the lower sheet 1 is connected to the branch portion 22.

Example-1

80 w/t parts of mixing water was measured with respect to 100 w/t parts of calcined gypsum, and if necessary, required quantities of adhesive auxiliary agent, set accelerator, water reducing agent and so forth were measured. These materials were continuously introduced into the mixer 4. At the same time, a proper quantity of foaming agent was introduced into the gypsum slurry in the chute section 5, by means of the foam feeding conduit 44. The gypsum slurry mixed in the mixer 4 flowed into the chute section 5 and it was discharged from the conduit 5*a* to the center part of the lower sheet 1 after addition of the foam. The slurry, which flowed into the chute section 5, was partially fractionated by the apparatus 30. The agitator 10 was kept inoperative, and the slurry of the conduit 11 was directly discharged to the respective side edge portions of the lower sheet 1 (edge portions on both sides) by means of the branch portion 22 and the conduits 12'.

In accordance with a normal process of manufacturing gypsum boards, gypsum boards having a thickness of 12.5 mm were successively produced. The gypsum board thus obtained was 0.65 g/cm$^3$ in its density. Measurement of the density of slurry was practiced every 10 minutes during 120 minutes (measurements of 13 times in total), by a measuring method as described later, and evaluation of the quality of the gypsum board was practiced by the quality evaluation method as described later.

Example-2

The materials for the same blending as that of example-1 were successively introduced into the mixer 4. The slurry, which was mixed in the mixer 4, flowed into the chute section 5, and a proper quantity of foam was introduced into this slurry by the conduit 44'. Most of the slurry was discharged to the center part of the sheet 1 from the conduit 5*a*, and a part of the slurry was fractionated by the apparatus 30. The agitator 10 was in operation, and the slurry of the conduit 11 was fed to the agitator 10. The high density slurry, which had been subjected to the foam-breaking or defoaming action of the agitator 10, was discharged to the respective side edge portions of the lower sheet 1 (edge portions on both sides) through the a pair of high density slurry conduits 12.

Similarly to example-1, gypsum boards having a thickness of 12.5 mm and a density of 0.65 g/cm$^3$ were successively produced in accordance with a normal process of manufacturing gypsum boards, and the measurements of the density of slurry (measurements of 13 times in total) and the evaluation of the quality of gypsum board were carried out.

Comparative Example

Figure 12:
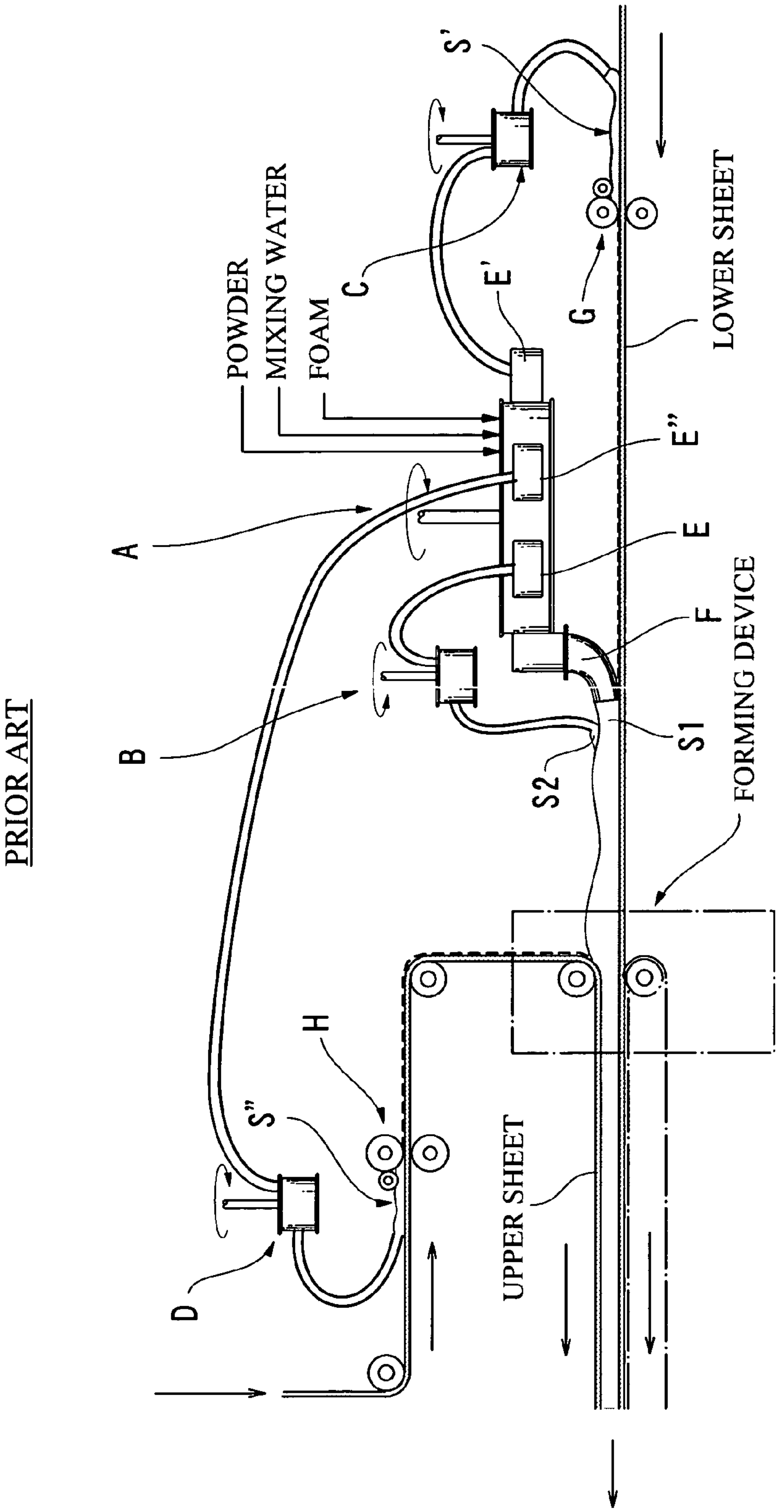
FIG. 12 is a side view schematically illustrating a conventional gypsum board manufacturing machine.

As a comparative example, the conventional mixer A as shown in FIG. 12 was used and the materials for the same blending as that of example-1 were successively introduced into the mixer A. A proper quantity of foaming agent was fed into the mixer A by a foam feeding conduit connected to an upper plate of the mixer A. Most of the gypsum slurry flowed into the chute section F and was discharged to the center part of the lower sheet. A part of the slurry flowed into the slurry delivery conduit through the slurry fractionation port E on the peripheral outer wall of the mixer A, and it was fed to the slurry agitator B. The high density slurry, which had been subjected to the foam-breaking or defoaming action of the agitator B, was discharged to the respective side edge portions of the lower sheet (edge portions on both sides) through a pair of high density slurry discharge conduits.

Similarly to example-1 and example-2, gypsum boards having a thickness of 12.5 mm and a density of 0.65 g/cm$^3$ were successively produced in accordance with a normal process of manufacturing gypsum boards, and the measurements of the density of slurry (measurements of 13 times in total) and the evaluation of the quality of gypsum board were practiced.

A method of measuring the density of slurry and a method of measuring the variation of slurry flow rate are as follows:

(I) Method of Measurement of the Slurry Density

The gypsum slurry discharged to the center part of the sheet and the high density slurry discharged to the edge portions of the sheet through the high density slurry conduit or the branch conduit were received and filled in a paper cup having a capacity of 343 cm$^3$ (343 cm$^3$ in a condition that the slurry is received in the cup and charged in one level therein), immediately before depositing on the sheet. Attention was paid to the manipulation of charging the slurry into the cup so as not to entrain air from the ambient atmosphere.

The cup filled with the slurry was weighed, and the density of slurry was obtained by the formula as below. The average of the density of slurry and the standard deviation thereof were obtained with respect to thirteen measurements. The average and standard deviation of the density of slurry are indicated in FIG. 10.

Density of slurry(g/cm$^3$)=(Weight of the paper cup filled with the slurry−Weight of the empty paper cup)/Capacity of the cup (II) Change of Flow Rate of Fractionated Slurry When the operation of the gypsum board manufacturing machine became a steady condition, color ink of 200 cm$^3$ was injected into the fluid passage of the slurry fractionated from the mixer, for three seconds (3 sec.), so that the fractionated slurry discharged to the side edge portions of the lower paper was colored for approximately ten seconds (10 sec.). Two gypsum boards, which had the gypsum cores colored at their edge portions (i.e., the boards produced during injection of the color ink), were picked up from the produced gypsum boards (910 mm width×1820 mm length), and the cross-sectional areas of the colored parts were measured on end faces of each of the two boards. More concretely, the cross-sectional areas of the colored parts on the both end faces were measured with respect to the both side edges of each of the boards (as for each board, measurements of cross-sectional areas of four colored parts). The results obtained from the measurements of the cross-sectional areas of the eight colored parts with respect to the two boards were averaged, so that the average value A was obtained.

After two hours, the average value B of the cross-sectional areas of the colored parts was obtained in the same way, and the change in the flow rate of the fractionated slurry was obtained by B/A.

The change in the flow rate of the fractionated slurry are shown in FIG. 10.

The manner of evaluating the quality of gypsum board is as follows:

(i) Sampling of Gypsum Boards

One gypsum board was picked up every one hour during production of the gypsum boards in each of examples-1, 2 and the comparative example, so that twenty-four (24) samples in total were picked up in twenty-four hours (24 hr). The surface hardness was firstly measured with respect to the twenty-four (24) gypsum boards.

(ii) Surface Hardness Test at the Side Edge Portion

With use of a rubber durometer, the hardness was measured at each of ten positions which were spaced a distance of 10 mm from the edges on the right face of gypsum board and which were at intervals of 100 mm in the lengthwise direction of the board. The average of the measured values was deemed to be the surface hardness in the edge portions of the board. The results of measurement of the surface hardness are shown in FIG. 10.

(iii) Adhesiveness Test

The gypsum boards after the measurements of the surface hardness were cut for measurements of the adhesiveness and the core hardness, so that test pieces were prepared. The test pieces for the measurements of the adhesiveness were left in a room, whereas the other test pieces were placed within a dryer, the temperature of which were set to be 40° C., so that they were dried until they had a constant weight. The size of each of the test pieces and the number of the test pieces picked up from one of the gypsum boards were as follows:

Adhesiveness test

Size of the test piece:910 mm(the overall width of the gypsum board)×300 mm(the length after cutting)

Number of the test pieces: one piece per one gypsum board

Core hardness test

Size of the test piece:910 mm(the overall width of the gypsum board)×300 mm(the length after cutting)

Number of the test pieces: two pieces per two gypsum boards

In the adhesiveness test of the right face, at first, a cut extending over the width of the test piece was made on the reverse face paper of the test piece by a cutter, as shown in FIG. 11A, and then, the core was forcibly bent in an opposite direction, as shown in FIG. 11B. As shown in FIGS. 11C and 11D, the test piece was pulled in such a manner that a force was applied to the piece equally over the whole width, and the right face paper was torn off, and then, the area of a portion in a still adhered condition was measured for obtaining its ratio (indication of percent (%)). As shown in FIG. 11E, the portion in the adhered condition includes not only the portion of the liner paper remaining on the core in an initial state, but also a delaminated portion of the paper in which internal splitting occurs (the portion in which delamination of the paper is caused owing to stronger adhesiveness between the paper and the core). On the other hand, an exposed part of the core is a portion in which the adhesiveness between the paper and the core is weaker so that the paper is separated (peeled off) from the core prior to tearing or delamination of the paper. The percentage of the adhered condition part relative to a predetermined area (i.e., the ratio of the part in which the core is not exposed) was obtained from the results of the measurements.

Similarly, the adhesiveness test of the reverse face of gypsum board was performed and the ratio of the adhered condition part relative to a predetermined area was obtained (indication of percent (%)).

The results of adhesiveness test are shown in FIG. 10, in which the results are indicated as being the average of six measurements for each of the right and reverse faces.

(i) Core Hardness Test on Both Sides

The core hardness test was carried out in accordance with "Core, End, and Edge Hardness (Method A)" of ASTM C473-00 (Standard Test Method for Physical Testing of Gypsum Panel Products). The gypsum board liner paper was removed from the test piece, and the core hardness was measured with respect to five points at equal intervals in a condition that the core is exposed. The results of the measurements are shown in FIG. 10.

On the basis of the results of measurement of the slurry density and the results of quality evaluation of the gypsum board as shown in FIG. 10, the examples and the comparative example are explained by comparison therebetween hereinafter.

In regard to the slurry density, the standard deviations of the edge parts and the center part were reduced in each of examples-1, 2, in comparison with those of the comparative example. Particularly, reduction of the standard deviations was significant as regards the side edge parts. This clearly indicates that the density of the slurry fractionated from the mixer was substantially stabilized by employment of the apparatus for fractionating slurry according to the present invention.

In comparison of the examples and the comparative example in regard to the change in the slurry flow rate, the slurry flow rate considerably changed in the comparative example (the rate of change B/A=0.82), but little change of the slurry flow rate was observed in the examples (the rate of change B/A=0.99 or 1.02). That is, the flow rate of the fractionated slurry was very stable in example-1 and example-2, compared to the comparative example. Thus, it was confirmed from such results that the gypsum slurry having the stable flow rate could be fractionated from the mixer by the apparatus according to the present invention.

As regards the average value of the surface hardness and the adhesiveness of reverse face, the examples and the comparative example exhibited almost equal performances. However, example-1 and example-2 exhibited excellent performances with respect to the adhesiveness of the right face, the standard deviation of the surface hardness, and the average value and the standard deviation of the core hardness, compared to the comparative example. It is considered that such improvement of the performances results from stability of the density and flow rate of the gypsum slurry which was fractionated from the mixer by the apparatus according to the present invention.

The consumption rate of the foaming agent and that of adhesive auxiliary agent (the quantity of addition per a standard gypsum board) were significantly reduced in example-1 and example-2, as indicated in the lower part of FIG. 10. Reduction of the consumption rate of the foaming agent (that is, reduction of the consumption of the foam) in example-1 is deemed to result from the facts that the gypsum slurry, into which the foam was mixed, was not stirred nor agitated in the mixer and the slurry agitator, and that the foam was not subjected to the foam-breaking or defoaming action of the mixer and the slurry agitator. Reduction of the consumption rate of foaming agent (reduction of the consumption of the foam) in example-2 is considered to be a result of the facts that the gypsum slurry, to which the foam was added, was not stirred in the mixer, and that the foam was not subjected to the foam-breaking or defoaming action of the mixer.

Although the present invention has been described as to a preferred embodiments and examples, the present invention is not limited thereto, but may be carried out in any of various modifications or variations without departing from the scope of the invention as defined in the accompanying claims.

For insurance, in the aforementioned embodiments and examples, the valve means of the apparatus for fractionating gypsum slurry is merely operated under two-position control to either of the fully opening position or the fully closing position, depending on whether or not the slurry is fractionated. However, the valve means can be controlled to be in an intermediate position between the opening and closing positions so that the pressure difference between the slurry delivery conduit and the chute section can be appropriately regulated under variable control.

Further, the number, position and orientation of the fractionation port, the number and position of the apparatus for fractionating slurry, the arrangement of the mechanism for operating the valve means, and so forth, can be appropriately modified in their designs.

Furthermore, the apparatus may not be necessarily arranged to feed the fractionated slurry to all of the slurry agitators, but it can be arranged so that the slurry fractionated from the apparatus is merely fed to, for instance, the hard edge mixer and that the slurry fractionated from a fractionation port on the peripheral outer wall of the mixer is fed to the slurry agitator for the roll coater.

In addition, an electric or electromagnetic type of driving device may be employed as the driving mechanism for the valve means.

The invention claimed is:

1. A machine for manufacturing gypsum board with a gypsum core covered with a sheet of paper for gypsum board liner, comprising:

a chute section having a slurry discharge port for feeding gypsum slurry for the gypsum core to a widthwise center part of a sheet of paper for gypsum board liner with a stable density and pressure;

a single mixer having a housing and a mixing area therein for the mixing of calcined gypsum and water for preparation of a gypsum slurry;

a hollow connector section having an inlet end opening directly to the mixing area for receiving the gypsum slurry directly from the mixing area and an outlet end opening directly to the chute section for providing a continuous flow of the gypsum slurry from the mixing area into the chute section by pressure of the mixer only, with a stable density and pressure;

a slurry delivery conduit having a stable slurry flow rate;

a slurry fractionation port disposed on a top wall of at least one of the chute section and the hollow connector section and in fluid communication with the slurry delivery conduit for receiving a part of the gypsum slurry from the mixer through at least one of the chute section and the hollow connector section, for continuously fractionating the received gypsum slurry in at least one of the chute section and the hollow connector section with a stable density and flow rate by the pressure of the mixer only, and for delivering the fractionated gypsum slurry to the slurry delivery conduit for at least one of a roll coater and a side edge portion of the sheet, by fluid pressure of the gypsum slurry only:

a valve for opening and closing the slurry fractionation port, and for controlling the pressure of the slurry fractionated through the slurry fractionation port; and a casing which encloses the slurry fractionation port and the valve and which has a slurry delivery port, wherein the slurry delivery conduit is connected to the slurry delivery port so as to be in fluid communication with the slurry fractionation port through an internal area of the casing.

2. The machine as defined in claim 1, further comprising a foam feeding port, which adds foam or foaming agent to the gypsum slurry for regulating density of the slurry, disposed on at least one of said hollow connector section and said chute section.

3. The machine as defined in claim 2, wherein said foam feeding port is disposed on a downstream side of said slurry fractionation port.

4. The machine as defined in claim 3, wherein both of said foam feeding port and said slurry fractionation port are disposed on said chute section, and the slurry fractionation port is located, upstream of the foam feeding port in a direction of flow of the slurry.

5. The machine as defined in claim 1, wherein said slurry fractionation port is disposed on a top wall of at least one of said chute section and said hollow connector section.

6. The machine as defined in claim 1, further comprising a driving device and drive control means for operating said valve means to open or close.

7. A method for producing gypsum boards using the machine as defined in claim 1, comprising:

a slurry preparing step of feeding the calcined gypsum and water into the mixing area of the mixer, mixing them therein for preparation of the gypsum slurry, and displacing the gypsum slurry from said mixing area to said chute section via said hollow connector section;

a slurry fractionating step of causing a part of the slurry effluent from said mixing area to be fractionated in at least one of said chute section and said hollow connector section as fractionated slurry by the pressure of the mixer only, and feeding the fractionated slurry through said conduit to at least one of the roll coater and the side edge portion of a sheet of paper for gypsum board liner; and a slurry discharging step of discharging a remainder of the gypsum slurry, from which the fractionated slurry has been fractionated, through said slurry discharge port of the chute section onto the center part of the sheet of paper for gypsum board liner, wherein at least one of a core of an edge portion of the gypsum board and an interface portion between a core and the sheet of paper for gypsum board liner is formed by said fractionated slurry.

8. The method as defined in claim 7, wherein foam or foaming agent for regulating density of slurry is mixed into said remainder of the gypsum slurry after the fractionated slurry has been fractionated.

9. The method as defined in claim 8, further comprising a fractionated slurry agitating step of agitating said fractionated slurry with use of a slurry agitator.

10. The method as defined in claim 7, further comprising a fractionated slurry agitating step of agitating said fractionated slurry with use of a slurry agitator.

11. A method for fractionating gypsum slurry with use of the machine as defined in claim 1, wherein a part of the gypsum slurry limited in a content of the foam or foaming agent is delivered through said slurry fractionation port to said slurry delivery conduit.

12. A method for fractionating gypsum slurry with use of the machine as defined in claim 1, wherein a fluid passage between said slurry delivery conduit and at least one of said chute section and said hollow connector section is periodically closed or opened by closing and opening operation of said valve means so as to prevent growth of a mass of set slurry in a fluid passage of the fractionated slurry.

* * * * *